United States Patent Office 3,574,579
Patented Apr. 13, 1971

3,574,579
BRONZE-IRON METAL-BONDED DIAMOND ABRASIVE ARTICLES CONTAINING BORON NITRIDE PARTICLES
Howard S. Clarke, Deane, Bolton, England, assignor to The Carborundum Company, Niagara Falls, N.Y.
No Drawing. Filed May 5, 1969, Ser. No. 822,027
Claims priority, application Great Britain, May 24, 1968, 24,888/68
Int. Cl. B24d *3/02;* C04b *31/16*
U.S. Cl. 51—307                                             6 Claims

ABSTRACT OF THE DISCLOSURE

Metal-bonded diamond grinding wheels are improved by the inclusion of from about 15% to about 60% by volume of granular boron nitride, having a particle size ranging from about 63 to about 1000 microns, in the abrasive section of the wheel. The inclusion of the boron nitride reduces the temperature generated when the wheel is used without a liquid coolant, and improves the grinding ratio (weight of material removed per weight of wheel worn). The invention makes possible the general use of metal-bonded diamond abrasive wheels under dry grinding conditions, i.e., without a liquid coolant.

BACKGROUND OF THE INVENTION

The invention relates to bonded diamond abrasive articles and particularly but not exclusively to diamond abrasive grinding wheels.

In U.S. Pat. No. 3,081,161 there is disclosed a diamond abrasive article comprising diamond abrasive grains boned by a resin, metal or ceramic bond containing up to 5% boron nitride powder. At that time additions of more than 5% boron nitride appeared to give no additional benefits and furthermore resulted in appreciable loss of bond strength.

One important application for diamond abrasive grinding wheels lies in the field of tungsten carbide grinding. It has been proposed to use resin-bonded diamond abrasive grinding wheels for the application under dry grinding conditions. Alternatively, metal-bonded diamond wheels have also been proposed but the use of a liquid coolant, i.e., wet grinding, has normally been necessary.

SUMMARY OF THE INVENTION

It is, therefore, an object of this invention to provide a more efficient diamond abrasive article.

It is a further object of this invention to provide an improved metal-bonded diamond abrasive grinding wheel for dry grinding.

According to the present invention, there is provided a bonded diamond abrasive article having a diamond abrasive section comprising diamond abrasive particles, boron nitride particles and a metal bond, said boron nitride particles being within the particle size range (maximum diameter) of about 63 to about 1000 microns and comprising from about 15% to about 60% by volume of the diamond abrasive section. A particle size of about 105 to about 180 microns is preferred.

DETAILED DESCRIPTION

By virtue of the present invention, it has been discovered that greatly increased amounts of boron nitride can be incorporated in the abrasive section of a diamond abrasive article by introducing the boron nitride in granular form in combination with high strength bonds. The stronger the bond, the greater the amount of granular boron nitride which can be incorporated.

Examples of the present invention will now be described.

Example 1

A bronze-iron metal-bonded wheel containing 50% boron nitride by volume in the diamond abrasive section was used for grinding tungsten carbide tool tip material having a Vickers hardness of VPN 1500–1600.

A conventional resin bonded diamond wheel which is normally used for this application was tested at the same time. Conditions were controlled at the standard conditions for the resin-bonded wheel in respect of speeds and infeeds. Both wheels were used dry, i.e., without a liquid coolant. The wheels were 3½" diameter of the flared cup type known in the industry as D11A2 (or simply 11A2) and both had annular diamond abrasive sections ⅜" wide (leaving a 2¾" inner diameter) and ⅟₁₆" deep containing 8.28 carats of 100 grit (150–180 microns) synthetic diamond. The 50% by volume boron nitride had a particle size of 150–210 microns.

Results were as follows:

|  | Grinding ratio | Temperature generated, ° C. |
|---|---|---|
| Resin bond | 33.8 | 80 |
| Metal bond and BN | 61.6 | 33 |

The grinding ratio figures are the weight in grams of tungsten carbide removed per carat of diamond consumed. The temperature generated is measured by placing the junction of the thermocouple on the grinding face of the wheel immediately after the test is completed.

As can be seen from the above, the metal-bond wheel was cooler cutting, faster cutting, and had a higher grinding ratio.

Example 2

A 3½" diameter, bronze-iron metal-bonded wheel of the D11A2 flared cup type had an annular abrasive section ⅛" deep and ⅜" wide. The abrasive rim contained abrasive particles of 100 grit (150–180 microns) diamond at a concentration of 36 carats per cubic inch and 100 grit boron nitride. The boron nitride content was 50% by volume of the diamond abrasive rim. Used dry, the above wheel, in accordance with the present invention was found to have about 80% of the life of an identical sized, conventional resin bonded, diamond abrasive wheel having a concentration of diamond of 72 carats per cubic inch in the abrasive rim. The wheel according to the present invention, however, costs only slightly more than half the price of the conventional resin bonded wheel, due to the lower diamond concentration in the diamond abrasive section of the wheel. Thus the wheel according to the present invention was substantially more economical than the conventional resin bonded wheel.

Example 3

A 4" diameter, ⅗₆" thick, bronze-iron metal-bonded wheel of the D1A1 type (also known simply as 1A1, consisting of a straight disc-shaped central core and an annular diamond abrasive section having a rectangular cross section) has a peripheral abrasive section ⅛" deep. The abrasive section contains 150 grit (105–125 microns) diamond abrasive and 150 grit boron nitride. The diamond concentration in the coat is 72 carats per cubic inch and the amount of boron nitride employed is 50% by volume of the diamond abrasive section. Such a wheel can grind 18,000 tips on tungsten carbide tipped saws before replacement, whilst a conventional wheel can only grind in the region of 10,000 tips before replacement.

It will be noted that in the above Examples 1 and 2 the performance of a grinding wheel according to the present invention is compared with the performance of a conventional resin bonded wheel employed for grinding tungsten carbide and not with the performance of metal-bonded diamond abrasive wheel without boron nitride. This is because under dry grinding conditions a metal-bonded diamond abrasive wheel without boron nitride does not grind at all except for a short initial period since it becomes quickly glazed to the point of uselessness.

A comparison of metal-bonded diamond abrasive wheels with and without boron nitride under wet grinding conditions (under which is a metal-bonded diamond abrasive wheel without boron nitride is very satisfactory) does not indicate any benefit from the inclusion of boron nitride. The present invention, however, is concerned with the heretofore unsolved problem of the general use of metal-bonded diamond abrasive wheels under dry grinding conditions.

Many grinding machines are designed for use with a mist coolant which may be said to be neither wet or dry. For the purpose of this invention, grinding with a mist coolant is regarded as dry grinding.

I claim:

1. A bonded diamond abrasive article suitable for dry grinding of tungsten carbide having a diamond abrasive section comprising diamond abrasive particles, boron nitride particles and a bronze-iron metal bond, said boron nitride particles being within the particle size range of about 63 to about 1000 microns and comprising from about 15% to about 60% by volume of the diamond abrasive section.

2. The article of claim 1, wherein the boron nitride particles range in size from about 105 to about 180 microns.

3. The article of claim 1, wherein the boron nitride particles comprise about 50% by volume of the diamond abrasive section of the article.

4. The article of claim 3, wherein the boron nitride particles range in size from about 105 to about 125 microns.

5. The article of claim 3, wherein the boron nitride particles range in size from about 150 to about 180 microns.

6. The article of claim 5, in the form of an abrasive grinding wheel.

References Cited

UNITED STATES PATENTS

| | | | |
|---|---|---|---|
| 3,081,161 | 3/1963 | Cantrell | 51—307 |
| 3,383,191 | 5/1968 | Thomas | 51—307 |

DONALD J. ARNOLD, Primary Examiner

U.S. Cl. X.R.

51—309